United States Patent
Miyahara

(10) Patent No.: US 6,959,922 B2
(45) Date of Patent: Nov. 1, 2005

(54) TRANSMISSION MOUNT STRUCTURE FOR VEHICLES

(75) Inventor: Tetsuya Miyahara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/655,118

(22) Filed: Sep. 4, 2003

(65) Prior Publication Data

US 2004/0045761 A1    Mar. 11, 2004

(30) Foreign Application Priority Data

Sep. 6, 2002    (JP) .............................. 2002-262016

(51) Int. Cl.[7] .............................. B60K 5/04; B60K 5/12
(52) U.S. Cl. .................... 267/140.3; 180/297; 180/291; 180/292; 180/299; 248/603; 248/605; 267/141; 267/153; 267/292
(58) Field of Search ...................... 267/140.11, 140.13, 267/140.3, 140.5, 292–294, 141, 153, 140.4; 180/291, 300, 312, 297, 902, 292, 293, 299, 180/295, 311; 248/605, 603, 638, 634, 562, 248/636, 560; 123/192.1, 195 A

(56) References Cited

U.S. PATENT DOCUMENTS

| 4,240,517 A | * | 12/1980 | Harlow et al. .............. 180/295 |
| 2004/0046099 A1 | * | 3/2004 | Miyahara et al. ........... 248/560 |
| 2004/0046296 A1 | * | 3/2004 | Miyahara ................. 267/140.3 |

FOREIGN PATENT DOCUMENTS

| JP | 61-188228 | * | 8/1986 |
| JP | 62-266248 | * | 11/1987 |
| JP | 7-305742 | * | 11/1995 |
| JP | 8-276753 | * | 10/1996 |
| JP | 10309945 A | | 11/1998 |

* cited by examiner

Primary Examiner—Douglas C. Butler
(74) Attorney, Agent, or Firm—Rankin, Hill, Porter & Clark LLP

(57) ABSTRACT

A transmission mount structure for mounting a transmission connected to an end of a transverse-mounted engine to a vehicle body includes an elastic main vibration-damping member for reducing both vibrations in a vertical direction and vibrations in a roll direction, and an elastic auxiliary vibration-damping member smaller in diameter or thickness than the main vibration-damping member and extending in a direction substantially perpendicular to the roll direction. The auxiliary vibration-damping member has a constricted portion formed at a longitudinal central portion thereof and having a smaller cross-section than any other part of the auxiliary vibration-damping member.

6 Claims, 6 Drawing Sheets

TRANSMISSION MOUNT STRUCTURE FOR VEHICLES

FIELD OF THE INVENTION

The present invention relates to an improvement in a transmission mount structure for vehicles.

BACKGROUND OF THE INVENTION

Various transmission mount structures for vehicles are known, wherein a transmission is supported at a single point while an engine, which forms together with the transmission a vehicle power unit, is supported at two points. One example of such known transmission mount structures is disclosed in Japanese Patent Laid-Open Publication HEI-10-309945.

The disclosed transmission mount structure, as illustrated here in FIG. 7, includes a mount member 107 attached at one end to a mount bracket 103 connected to an end of a transmission 101 and, at the other end, to a mount bracket 108 connected to a chassis frame 104 of a vehicle. The transmission 101 is connected to an output end of a transverse-mounted engine 100. A mount member 105 is connected to a front end portion of the engine 100 via a mount bracket 102 and also connected to the chassis frame 104 via a mount bracket 109. Similarly, a mount member 106 is connected via a mount bracket 102 to a rear end portion of a power unit composed of the engine 100 and the transmission 101 and also connected to the chassis frame 104 via a mount bracket 109. At least one end of each of the mount member 105, 106, 107 is made of elastic material such as rubber and forms an elastic vibration isolator.

With this arrangement, the mount members 105, 106, 107 need to isolate both vibrations in a vertical direction caused during traveling of the vehicle and vibrations in a roll direction caused by the acceleration, deceleration and idling of the engine 100 and to limit undue displacement of the power unit (i.e., a combined engine-and-transmission assembly) relative to the chassis frame 104. The "roll direction" is in the direction of rolling motions of the power unit caused by engine roll torque.

When an attempt is made to reduce vibrations in the vertical direction by using the mount member 107 provided at an end of the transmission 101, a normal approach would be enlargement of the cross-sectional area in a horizontal direction of the elastic end portion (vibration isolator) of the mount member 107. With this enlargement of the horizontal cross-sectional area, the spring constant of the elastic vibration isolator increases and an enhanced displacement limiting effect can be expected. However, since the spring constant in the roll direction of the elastic vibration isolator also increases with an increase in the horizontal cross-sectional area of the same elastic vibration isolator, it is no longer possible for the mount member 107 to effectively reduce vibrations and displacement in the roll direction. Thus, it is difficult to achieve a good combination of the spring constant in the vertical direction with the spring constant in the roll direction.

It is accordingly an object of the present invention to provide a vehicular transmission mount structure which is capable of achieving both a noticeable reduction in vibration in a vertical direction and a noticeable reduction in vibration in a roll direction of a power unit composed of an engine and a transmission.

SUMMARY OF THE INVENTION

According to the present invention, there is provided a transmission mount structure for mounting a transmission connected to an end of a transverse-mounted engine to a vehicle body, comprising an elastic main vibration-damping member for reducing both vibrations in a vertical direction and vibrations in a roll direction, and an elastic auxiliary vibration-damping member smaller in diameter or thickness than the main vibration-damping member and extending in a direction substantially perpendicular to the roll direction, the auxiliary vibration-damping member having a constricted portion at a longitudinal central portion thereof, the constricted portion having a smaller cross-section than any other part of the auxiliary vibration-damping member.

The relatively thin and centrally constricted elastic auxiliary vibration-damping member has a small spring constant in the roll direction of a power unit composed of the engine and the transmission, the transmission mount structure can isolate the vehicle body from vibrations in the roll direction caused by the acceleration, deceleration and idling of the engine. The main and auxiliary vibration-damping members used in combination maintain a relatively large spring constant in the vertical direction so that the transmission mount structure effectively isolates vibrations of the power unit in a low frequency range and hence insures a comfortable ride.

In one preferred form of the invention, the main vibration-damping member and the auxiliary vibration-damping member are spaced in a longitudinal direction of the vehicle. Preferably, the auxiliary vibration-damping member has an axis extending substantially vertically and the main vibration-damping member has an axis tilted toward the axis of the auxiliary vibration-damping member such that it comes close to the axis of the auxiliary vibration-damping member at an upper end thereof.

The transmission mount structure may further comprise a body-side bracket for attachment to the vehicle body and a transmission-side bracket for attachment to the transmission wherein the body-side bracket and the transmission-side bracket are connected together by the main and auxiliary vibration-damping members. Since the main and auxiliary vibration-damping members are integral with the body-side and transmission-side brackets, the transmission mount structure as a whole can be easily mounted to the vehicle body.

Preferably, the body-side bracket has an end portion extending horizontally and an end extension projecting from the end portion and lying in a higher plane than the end portion, and the auxiliary vibration-damping member has a lower end portion projecting outward from an under surface of the end extension downward beyond the level of an under surface of the end portion. When the body-side bracket is attached to the vehicle body with the end portion lying flush with a surface of the vehicle body, the end extension forms a cantilever structure which is susceptible to vibration. In this instance, however, the outwardly projecting lower end portion of the elastic auxiliary vibration-damping member is axially compressed and, by virtue of the elasticity of the lower end portion being thus deformed or preloaded, vibrations of the power unit is isolated and do not transmit to the end extension.

BRIEF DESCRIPTION OF THE DRAWINGS

A preferred structural embodiment of the present invention will be described in detail herein below, by way of example only, with the reference to the accompanying drawings, in which.

DETAILED DESCRIPTION OF THE PREFERRED EMBODIMENT

Figure 1:
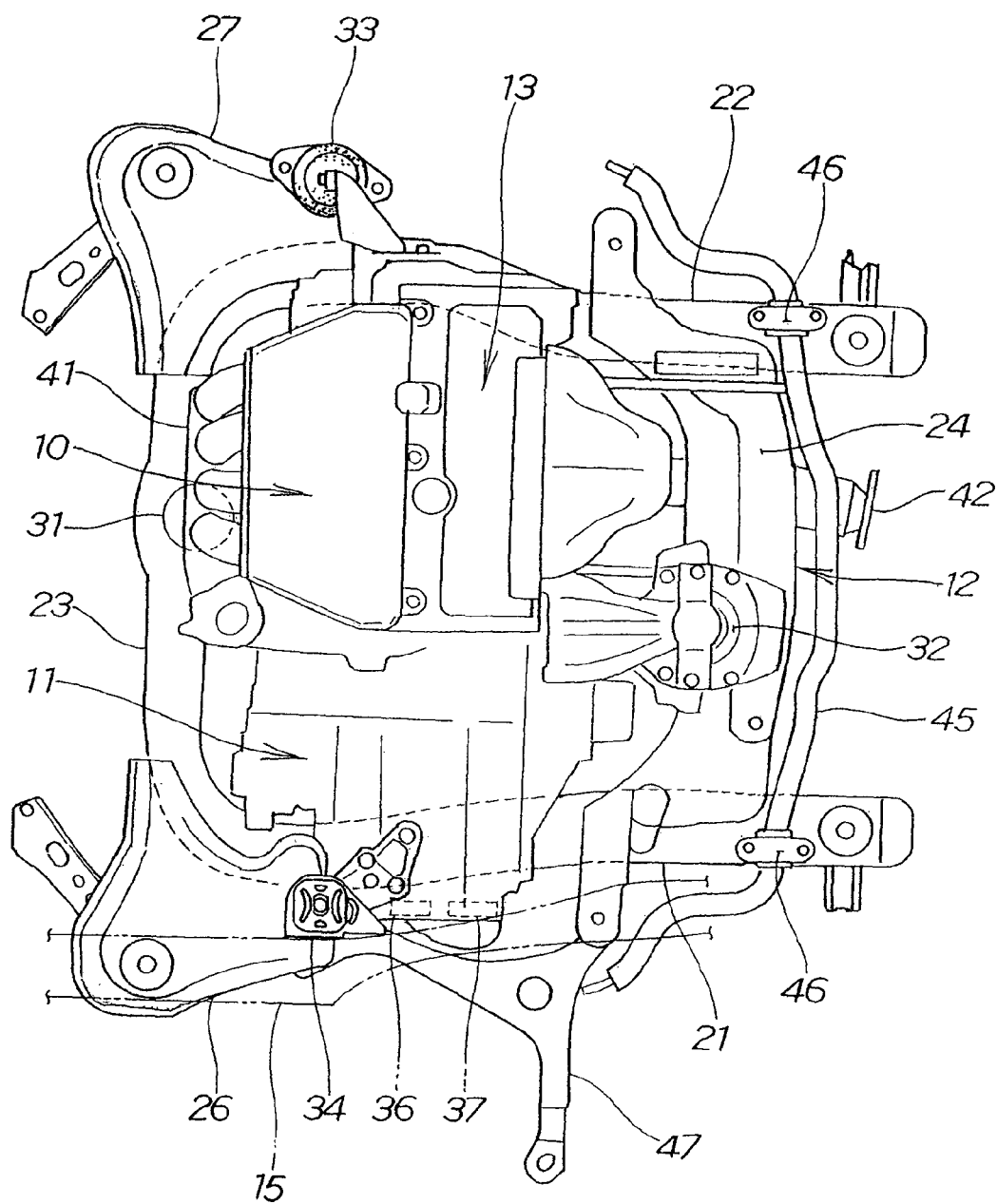
FIG. 1 is a plan view showing the interior of an engine room in which a vehicular power unit is installed using a mount system or mechanism including a transmission mount structure according to the present invention.

Referring now to the drawings and FIG. 1 in particular, there is shown in plan view the interior of a vehicular engine room in which a power unit 13 is installed using a mount system including a transmission mount structure according to the present invention. The power unit 13 of the vehicle is comprised of a transverse-mounted engine 10 and a transmission 11 connected or integrally assembled with an output end of the engine 10. Though not shown, the engine 10 has a crankshaft extending in a transverse direction of the vehicle. The engine 10 and transmission 11 thus assembled are supported by a sub-frame 12 and right and left front side frames (only the left front side frame being shown and designated by numeral 15).

The sub-frame 12 is an assembly formed jointly by left and right longitudinal sub-frame members 21 and 22 extending in a longitudinal or front-to-rear direction of the vehicle, front and rear crossbeams 23 and 24 connecting the longitudinal sub-frame members 21, 22 at their front ends and rear ends, respectively, a left plate 26 attached to a joint portion between the left longitudinal sub-frame member 21 and the front crossbeam 23, and a right plate 27 attached to a joint portion between the right longitudinal sub-frame member 22 and the front crossbeam 23. The sub-frame 12 as a whole is mounted on the right and left front side frames.

To support a power unit 13 composed of the engine 10 and the transmission 11, a plurality of mounts are used. These mounts are a front mount 31 disposed below a substantially central portion of a front part of the power unit 13, a rear mount 32 disposed below a substantially central portion of a rear part of the power unit 13, an engine side mount 33 disposed on a side of the engine 10 remote from the transmission 11, a transmission upper mount 34 disposed above an end portion of the transmission 11 located remotely from the engine 10, and transmission lower mounts 36, 37 disposed below the remote end portion of the transmission 11.

The transmission lower mount 37 constitutes a transmission mount structure according to the present invention. The transmission lower mount 37 is directly connected at one end to a sidewall of the transmission 11 and, at the other end, to the left longitudinal sub-frame member 21 of the sub-frame 12. The sub-frame 12 forms part of a vehicle body.

Reference numeral 41 shown in FIG. 1 denotes an intake manifold of the engine 10 and numeral 42 denotes an exhaust pipe connected to an exhaust manifold (not shown) of the engine 10. Similarly, numeral 45 denotes a stabilizer attached crosswise to the longitudinal sub-frame members 21, 22 via brackets 46, and numeral 47 denotes a suspension arm.

Figure 2:
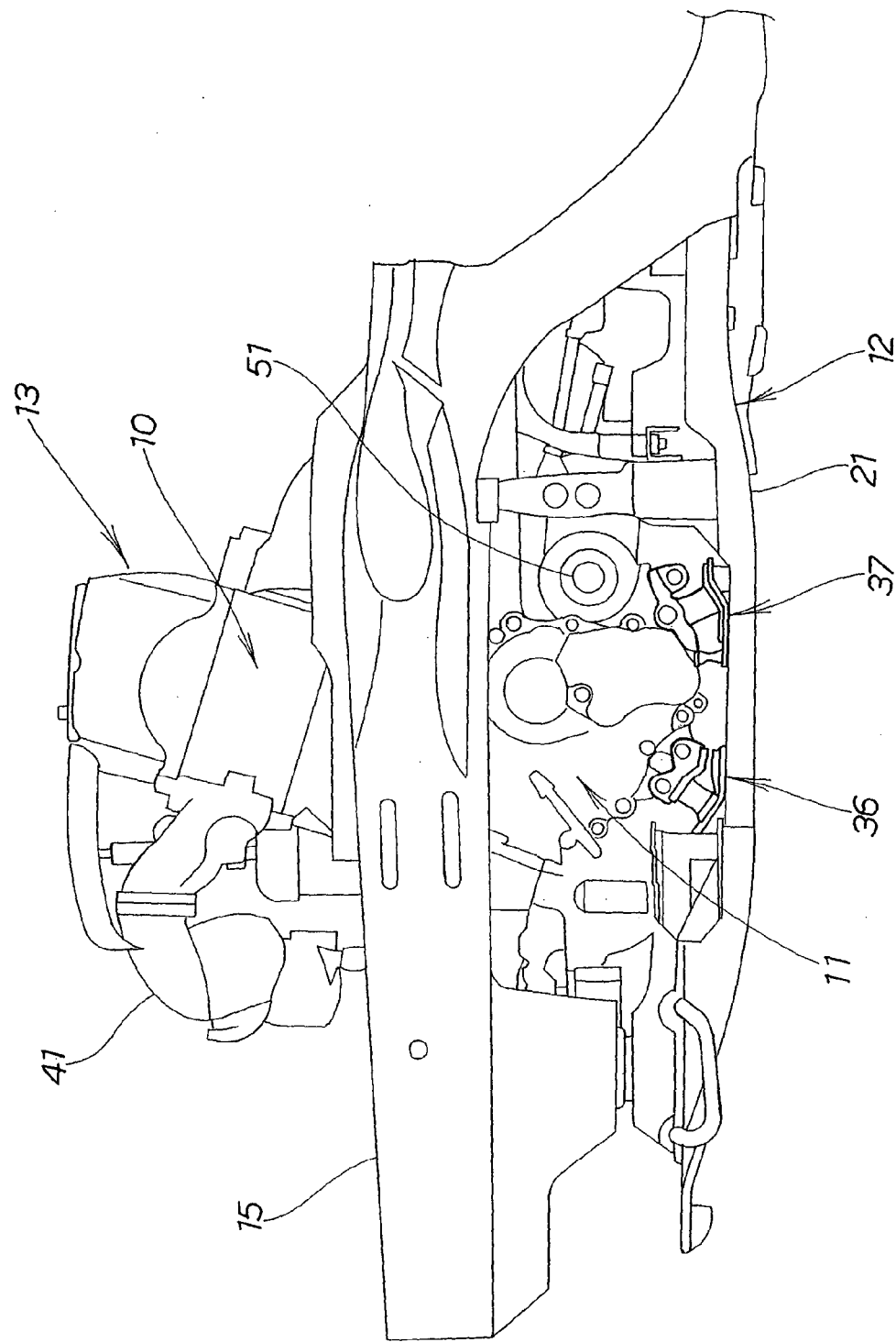
FIG. 2 is side view of FIG. 1, showing an end of a transmission of the power unit supported by two transmission lower mounts, one of which constitutes transmission mount structure according to the present invention.

As shown in FIG. 2, each of the transmission lower mounts 36 and 37 is connected between a lower portion of the transmission 11 and an upper surface of the left longitudinal sub-frame member 21 of the sub-frame 12. The transmission lower mounts 36, 37 are spaced in a longitudinal direction of the vehicle and the transmission lower mount 37 of the present invention is disposed rearward of the transmission lower mount 36. Numeral 51 denotes an output shaft of the transmission 11 for connection with a driveshaft (not shown) of the vehicle.

Figure 3:
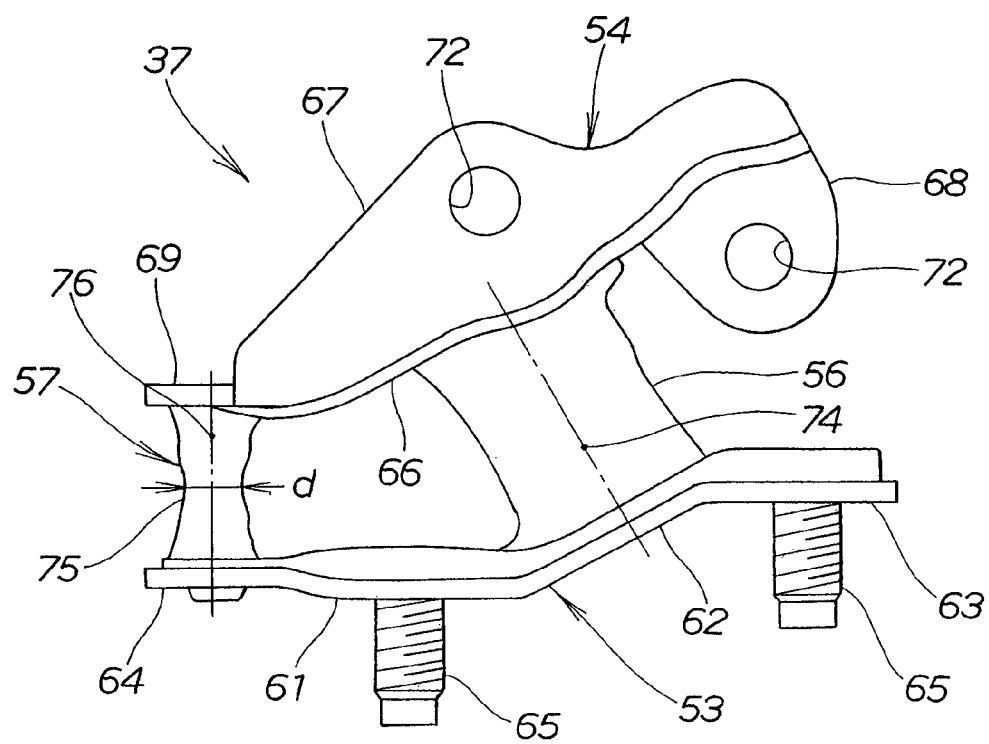
FIG. 3 is an enlarged view of a portion of FIG. 2, showing structural details of one transmission lower mount forming the transmission mount structure of the invention.

The transmission lower mount 37, which forms the transmission mount structure of the present invention, includes, as shown in FIG. 3, a lower bracket 53 for attachment to the sub-frame 12 (FIG. 2) of the vehicle body, an upper bracket 54 for attachment to the transmission 11 (FIG. 2) of the power unit 13, and a set of main and auxiliary vibration-damping members or dampers 56 and 57 made of elastic material such as rubber and elastically connecting the two brackets 53 and 54 at different positions. For the sake of convenience, the lower and upper brackets 53 and 54 are hereinafter referred to as "body-side bracket" and "transmission-side bracket", respectively, and the elastic main and auxiliary vibration-dampers 56 and 57 are hereinafter referred to as "main mount rubber" and "auxiliary mount rubber" respectively.

The body-side bracket 53 has a horizontal front portion 61, an inclined central portion 62 contiguous with and sloping upward from a rear end of the front portion 61, a horizontal rear portion 63 contiguous with a rear end of the central portion 62, and a front end extension 64 of the front portion 61 which extends forward from a front end of the front portion 61. The body-side bracket 53 also has two stud bolts 65, 65 projecting vertically downward from the horizontal front and rear portions 61 and 63 for attachment of the body-side bracket 53 relative to the sub-frame 12.

The transmission-side bracket 54 has an inclined plate-like base portion 66, an upper flange 67 projecting upward from the base portion 66, a lower flange 68 projecting downward from a rear part of the base portion 66, and a horizontal front end extension 69 of the base portion 66 which extends forward from a front end of the base portion 66. The upper and lower flanges 67, 68 each have a screw hole 72 through when a bolt or screw (not shown) extends to attach the transmission-side bracket 54 to the sidewall of the transmission (FIG. 2).

The main mount rubber 56, which forms the elastic main vibration-damper, extends between the inclined central portion 62 of the body-side bracket 53 and a central part of the inclined base portion 66 with its longitudinal axis 74 extending substantially at right angles to the inclined central portion 62 and the central part of the inclined base portion 66. Thus, the main mount rubber 56 normally has a forward-tilted posture, such as shown in FIG. 3. The forward-tilted main mount rubber 56 can support or bear both loads in a vertical direction (i.e., compressive and tensile loads) and loads in a roll direction (i.e., shear load) at right angles to the longitudinal axis 74 of the main mount rubber 56.

The auxiliary mount rubber 57, which forms the elastic auxiliary vibration-damper, extends between the front end extension 64 of the body-side bracket 53 and the front end extension 69 of the transmission-side bracket 54 with its longitudinal axis 76 extending vertically (namely, at right angles to the horizontally extending front end extensions 64, 69). The auxiliary mount rubber 57 is considerably smaller in diameter or thickness than the main mount rubber 56 and has a constricted portion 75 at a longitudinal central portion thereof which is reduced in diameter or thickness and has a cross section smaller than that of any other part of the auxiliary mount rubber 57. The auxiliary mount rubber 57 thus constructed is able to bear or sustain vertical loads (namely, compressive and tensile loads) applied in a direction parallel to the longitudinal axis 76 of the auxiliary mount rubber 57. However, due to its relatively thin and centrally constricted structure, the auxiliary mount rubber 57 contributes little to the load-bearing operation with respect to loads in the roll direction. Reference character "d" in FIG. 3 denotes an outside diameter of the constricted central portion 75 of the auxiliary mount rubber 57.

Figure 4:
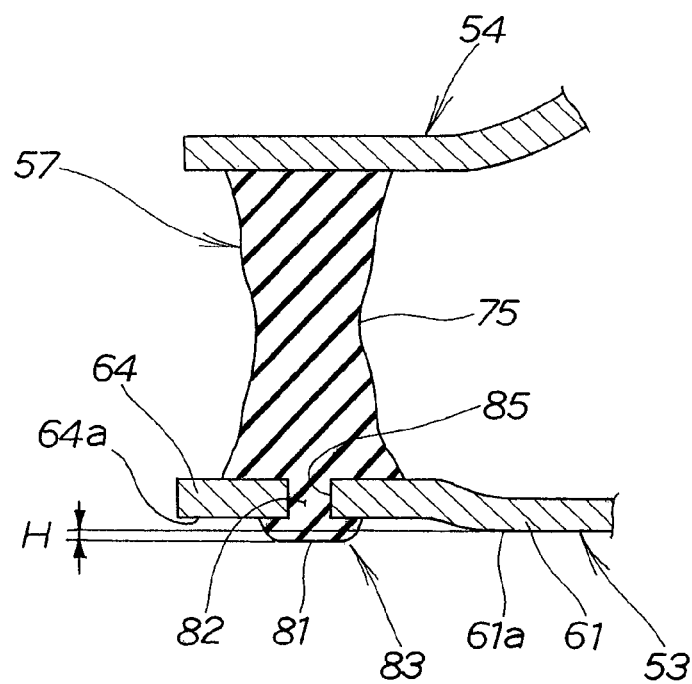
FIG. 4 is an enlarged vertical cross-sectional view of a portion of the transmission mount structure including an auxiliary mount rubber.

The auxiliary rubber mount 57 is attached by chemical bonding to the front end extensions 64, 69 of the respective brackets 53, 54. As shown in FIG. 4, the auxiliary rubber mount 57 has a lower end portion 83 projecting outward from the front end extension 64 of the body-side bracket 53. The lower end portion 83 includes a reduced neck 82 fitted in a hole 85 formed in the front end extension 64 and an enlarged head 81 lying on an under surface 64a of the front end extension 64. The under surface 64a lies in a plane higher than the plane of an under surface 61a of the horizontal front portion 61 of the body-side bracket 53. The outwardly projecting lower end portion 63 is configured such that in its free state (i.e., under no load condition), the head 81 projects downward beyond the level of the under surface 61a of the front end portion 61 by a distance H. With the lower end portion 83 thus configured, when the body-side bracket 53 is attached to the sub-frame 12 (FIG. 2) with the under surface 61a of the front portion 61 lying flat on an upper surface of the longitudinal sub-frame member 21, the head 81 is axially compressed by the longitudinal sub-frame member 21 until its top (bottom in FIG. 1) lies flush with the under surface 61a of the front end portion 61 (see, FIGS. 6A and 6B). By the elasticity of the head 81 being thus compressed or preloaded, the front end extension 64 is prevented from vibrating even though it has a cantilever structure.

Operation of the transmission lower mount (transmission mount structure) 37 will be described below with reference to FIGS. 5A and 5B. As shown in FIG. 5, when the power unit 13 including the transmission 11 vibrates in a vertical direction as indicated by the profiled arrowheads, the transmission lower mount 37 damps down or reduces the vertical vibrations in cooperation with the transmission lower mount 36. In this instance, both the main mount rubber 56 and the auxiliary mount rubber 57 undertake a vibration-damping action against vertical vibrations.

Figure 5A:
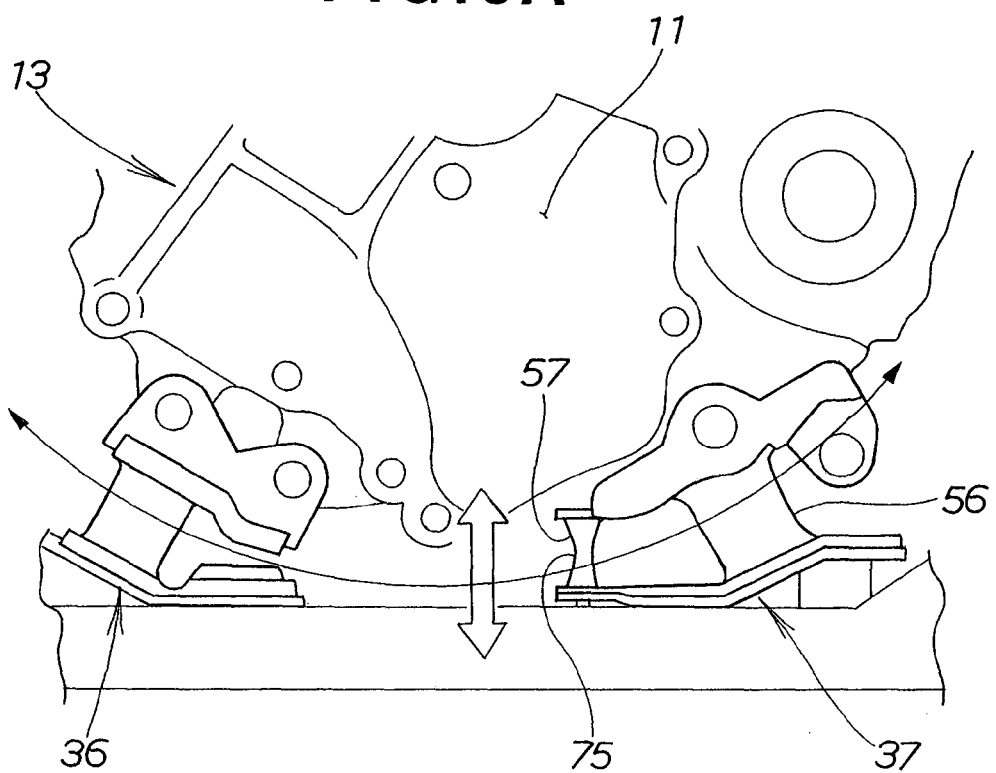
FIGS. 5A and 5B are views illustrative of operation of the transmission lower mounts.

When the acceleration, deceleration and idling of the engine 10 (FIG. 1) causes the power unit 13 to roll in a direction indicated by the solid-lined arcuate arrowheads shown in FIG. 5A, the main mount rubber 56 of the transmission lower mount 37 and the transmission lower mount 36 cooperate to dampen or reduce vibrations in the roll direction. In this instance, however, partly due to the longitudinal axis 76 (FIG. 3) extending substantially at right angles to the roll direction, and partly due to the presence of the constricted central portion 75, the auxiliary mount rubber 57 does contribute very little to vibration damping in the roll direction.

Figure 5B:
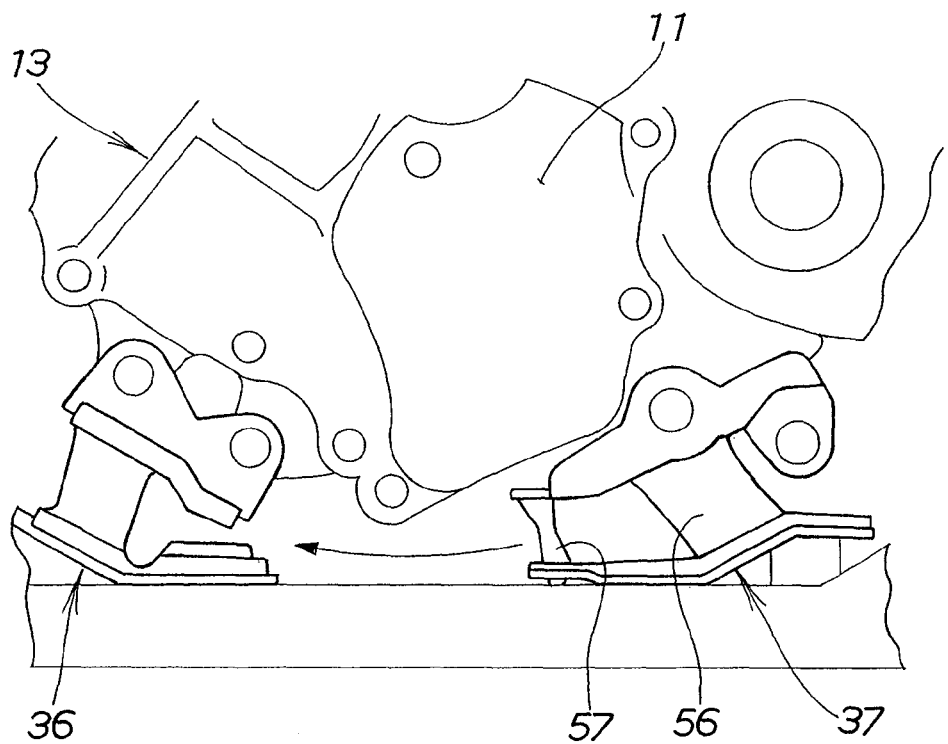
Figure 6A:
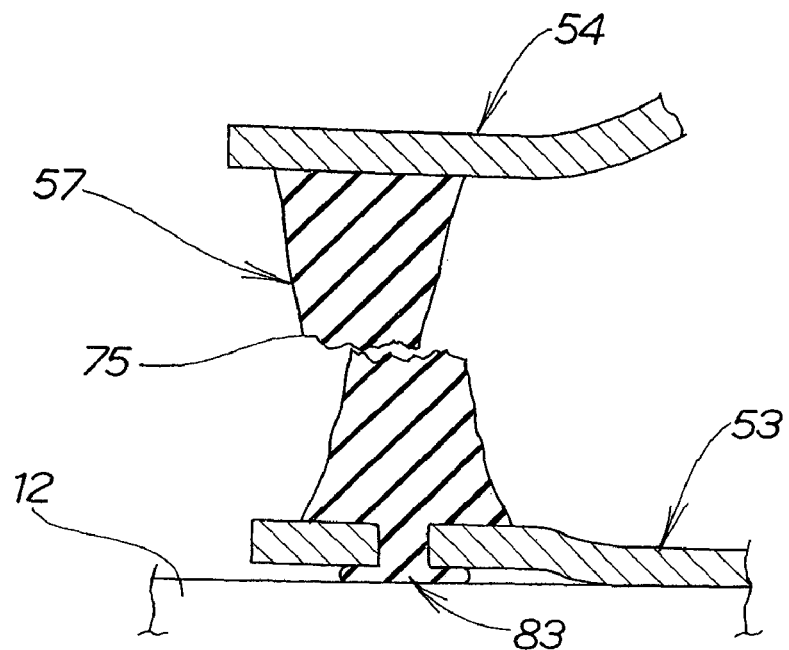
FIGS. 6A and 6B are cross-sectional views similar to FIG. 4, but showing operation of the auxiliary mount rubber after shear fracture.
Figure 6B:
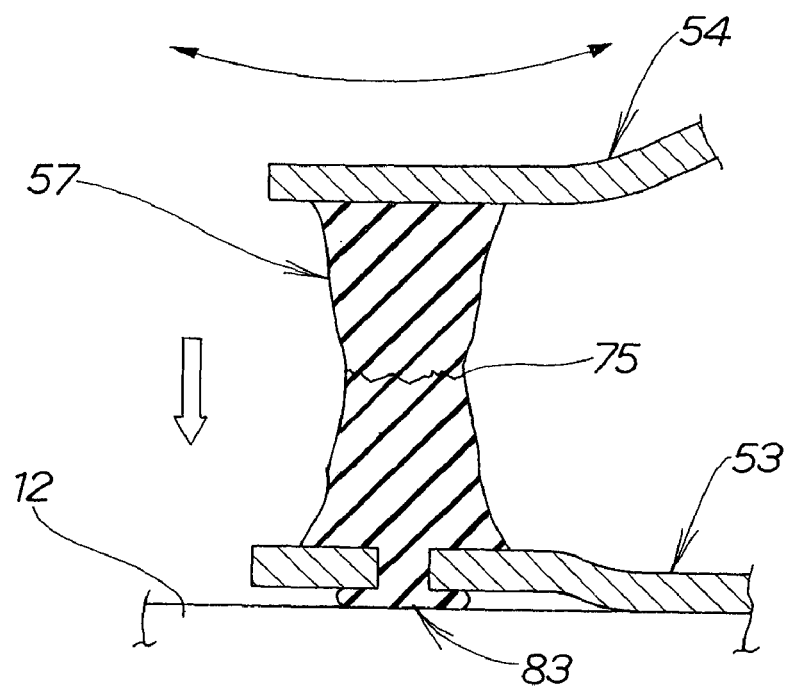
Figure 7:
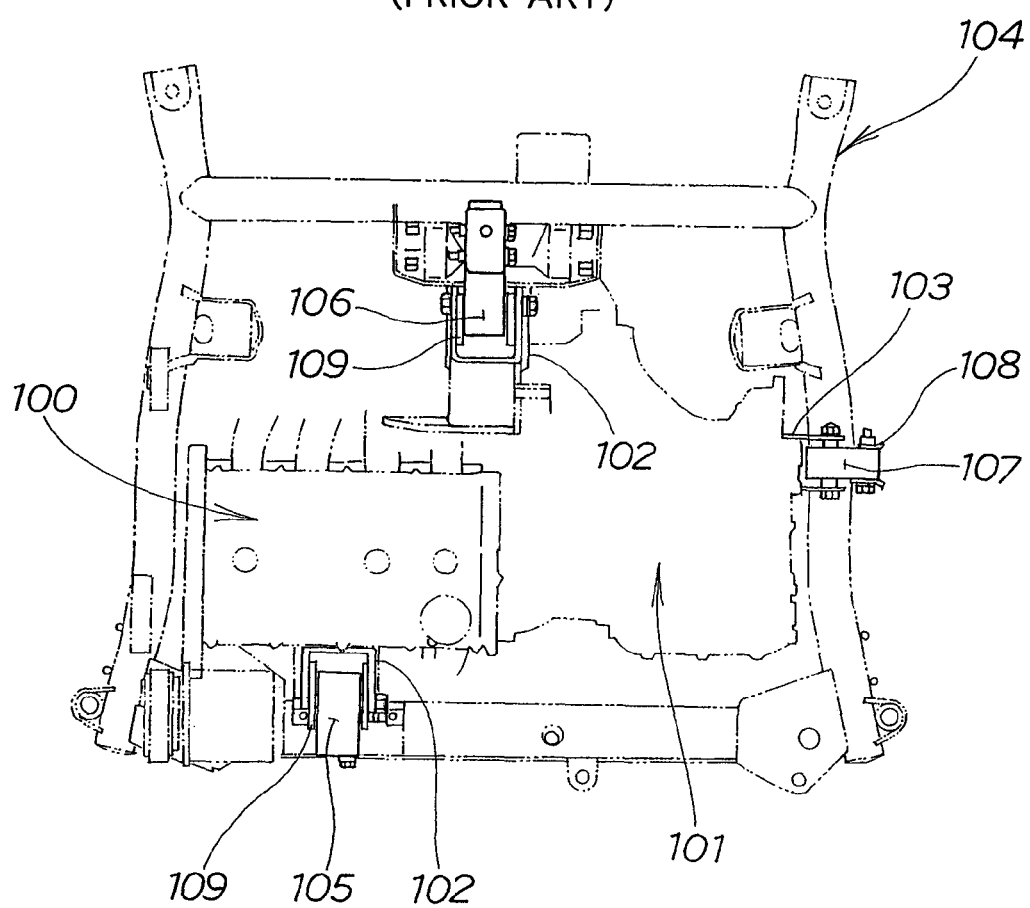
FIG. 7 is a plan view showing a conventional mount structure for a vehicular power unit including a transmission.

FIG. 5B shows a condition in which the power unit 13 is caused to roll in a forward direction of the vehicle. Under such rolled condition, the auxiliary mount rubber 57 is subjected to a shearing force. When the shearing force exceeds a predetermined value, a shear failure or fracture will occur at the constricted central portion 75 of the auxiliary mount rubber 57, as shown in FIG. 6A. Once the shear fracture occurs, the auxiliary mount rubber 57 is no longer possible to undertake a vibration damping action in the roll direction. However, it still can undertake a load bearing operation against compressive loads acting in a vertical downward direction as indicated by the profiled arrow shown in FIG. 6B. Thus, the fractured auxiliary mount rubber 57 shown in FIG. 6B is still able to dampen or reduce vertical vibrations in substantially the same manner as the normal or un-sheared auxiliary mount rubber shown in FIG. 4.

As thus far explained, a transmission mount structure 37 according to the present invention is used for mounting a transmission 11 connected to an end of a transverse-mounted engine 10 to a vehicle body 12 and generally comprises an elastic main vibration-damping member 56 for reducing both vibrations in a vertical direction and vibrations in a roll direction, and an elastic auxiliary vibration-damping member 57 smaller in diameter or thickness than the main vibration-damping member 56 and extending in a direction substantially perpendicular to the roll direction. The auxiliary vibration-damping member 57 has a constricted portion 75 formed at a longitudinal central portion thereof and having a smaller cross-section than any other part of the auxiliary vibration-damping member 57.

Since the relatively thin and centrally constricted elastic auxiliary vibration-damping member 57 has a small spring constant in the roll direction of a power unit 13 composed of the engine 10 and the transmission 11, the transmission mount structure 37 can keep the vehicle body 12 away from irritating vibrations in the roll direction caused by the acceleration, deceleration and idling of the engine 12. The main and auxiliary vibration-damping members 56 and 57 used in combination maintain a relatively large spring constant in the vertical direction so that the transmission mount structure 37 effectively isolates vibrations of the power unit 13 in a low frequency range and hence insures a comfortable ride.

A body-side bracket 53 for attachment to the vehicle body 12 and a transmission-side bracket 54 for attachment to the transmission 11 are connected by the main and auxiliary vibration-damping members 56, 57. Since the main and auxiliary vibration-damping members 56, 57 are integral with the body-side and transmission-side brackets 53, 54, the transmission mount structure 37 as a whole can be easily mounted to the vehicle body.

The body-side bracket 53 may has an end portion 61 extending horizontally and an end extension 64 projecting from the end portion 61 and lying in a higher plane than the end portion 61, and the auxiliary vibration-damping member 57 has a lower end portion 83 projecting outward from an under surface 64a of the end extension 64 downward beyond the level of an under surface 61a of the end portion 61.

When the body-side bracket 53 is attached to the vehicle body 12 with the end portion 61 lying flush with a surface of the vehicle body 12, the end extension 64 forms a cantilever structure which is susceptible to vibration. In this instance, however, the outwardly projecting lower end portion 83 of the elastic auxiliary vibration-damping member 57 is axially compressed and, by virtue of the elasticity of the lower end portion 83 being thus deformed or preloaded, vibrations of the power unit 13 is isolated and do not transmit to the end extension 64.

Obviously, various minor changes and modifications of the present invention are possible in the light of the above teaching. It is therefore to be understood that within the scope of the appended claims the present invention may be practiced otherwise than as specifically described.

What is claimed is:

1. In a vehicle having a transverse-mounted engine and a transmission connected to an end of the engine to form a power unit mounted on a vehicle body, a transmission mount structure for mounting the transmission to the vehicle body comprising:
    an elastic main vibration-damping member for reducing vibrations in both a vertical direction and in a roll direction; and
    an elastic auxiliary vibration-damping member smaller in diameter or thickness than the main vibration-damping member and extending lengthwise in a direction substantially perpendicular to the roll direction, the auxiliary vibration-damping member having a constricted portion at a longitudinal central portion thereof, the constricted portion having a smaller cross-section than any other part of the auxiliary vibration-damping member.

2. The transmission mount structure according to claim 1, wherein the main vibration-damping member and the auxiliary vibration-damping member are spaced in a longitudinal direction of the vehicle.

3. The transmission mount structure according to claim 2, wherein the auxiliary vibration-damping member has an axis extending substantially vertically and the main vibration-damping member has an axis tilted toward the axis of the auxiliary vibration-damping member such that the axis of the main vibration-damping member is closer to the axis of the auxiliary vibration-damping member at an upper end of the main vibration-damping member than at a lower end of the main vibration-damping member.

4. The transmission mount structure according to claim 1, further comprising:
    a body-side bracket for attachment to the vehicle body and a transmission-side bracket for attachment to the transmission, the body-side bracket and the transmission-side bracket being connected together by the main and auxiliary vibration-damping members, wherein the main vibration-damping member and the auxiliary vibration-damping member are spaced in a longitudinal direction of the vehicle.

5. The transmission mount structure according to claim 4, wherein the auxiliary vibration-damping member has an axis extending substantially vertically and the main vibration-damping member has an axis tilted toward the axis of the auxiliary vibration-damping member such that the axis of the main vibration-damping member is closer to the axis of the auxiliary vibration-damping member at an upper end of the main vibration-damping member than at a lower end of the main vibration-damping member.

6. The transmission mount structure according to claim 4, wherein the body-side bracket has an end portion extending horizontally and an end extension projecting from the end portion and lying in a higher plane than the end portion, and the auxiliary vibration-damping member has a lower end portion projecting outward from an under surface of the end extension downward beyond the level of an under surface of the end portion.

* * * * *